Sept. 9, 1941.　　　　E. B. PERRINE　　　　2,255,269

METHOD OF MAKING FILES

Original Filed Feb. 27, 1939　　　2 Sheets-Sheet 1

Inventor
Emmett B. Perrine
By _____
Attorney.

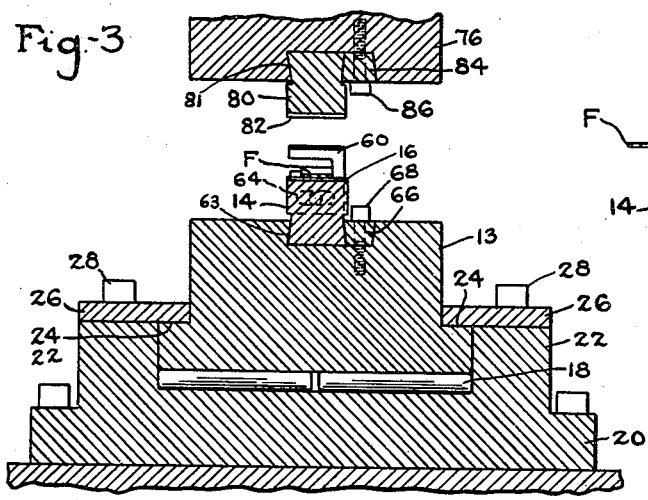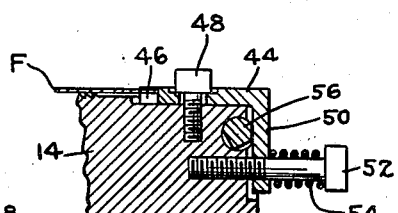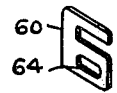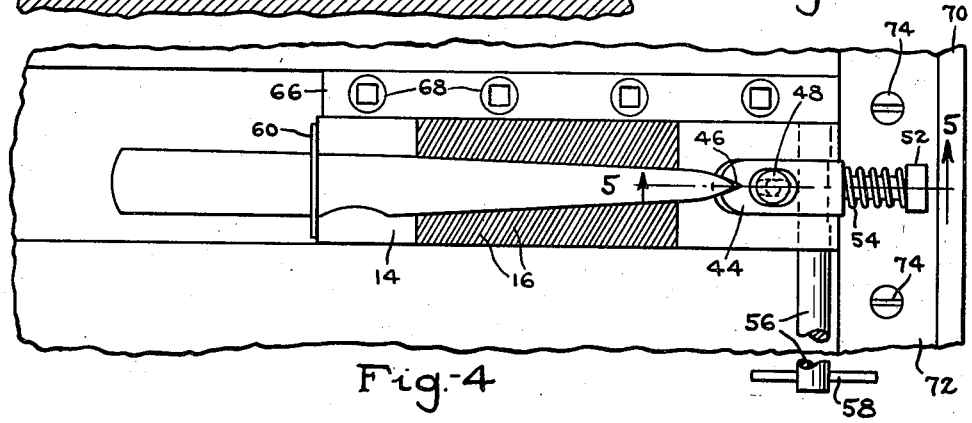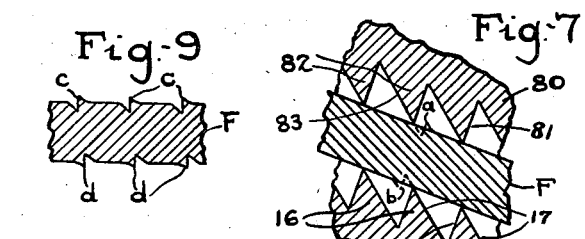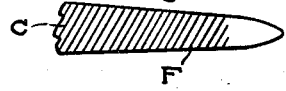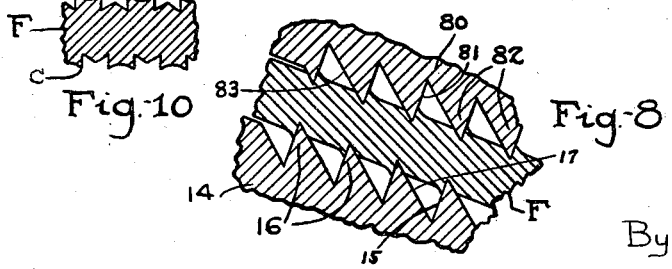

Patented Sept. 9, 1941

2,255,269

UNITED STATES PATENT OFFICE 2,255,269

METHOD OF MAKING FILES

Emmett B. Perrine, Minneapolis, Minn.

Original application February 27, 1939, Serial No. 258,615. Divided and this application April 22, 1940, Serial No. 330,839

2 Claims. (Cl. 76—24)

My invention relates to a method of making files and has for its object to perform certain steps on file blanks so as to produce therefrom sets of teeth on opposite sides of the blank simultaneously and to repeat the operation with the file blank turned over to produce similar sets of teeth but disposed angularly with respect to the teeth already made and cutting in the opposite direction, whereby a file is produced which cuts in both directions and with the same degree of efficiency cutting in both directions.

Heretofore files for commercial exploitation have been produced by forming teeth singly in succession on one side only of a file blank by operation of a combined reciprocating die and feed of the blank, followed by forming teeth on the opposite side of the blank through repeating the operation. The teeth formed in this manner are adapted to cut in one direction only, and after teeth are so formed on both sides of the file blank the respective sets of teeth on each side also cut in one direction only and in the same direction.

It is, therefore, a principal object of my invention to form die teeth on two die members, to slope a face of each set of teeth in opposite directions on the respective die members, and to engage the blank between said die members so that the tendency to move the blank in one direction as the die teeth on one side entering the body of the blank is exactly offset by the tendency to move the blank in the opposite direction by the die teeth entering on the other side.

It is a further object of my invention to hold a file blank in a set position, to cause sets of teeth having their respective faces sloping in opposite directions to be formed on opposite sides of the file blank, and to move the file blank relative to the teeth-forming means on each side of the blank while the teeth are being formed.

It is a further object of my invention to provide one die formed with teeth having sides thereof sloping in one direction, to hold a file blank relatively to said die teeth so that the same cross the file blank at an angle to its length, to provide a second die having teeth crossing the file blank in the same angular direction but having faces sloping in the opposite direction from those of the first named set of teeth, and to cause the respective sets of teeth to engage both sides of the blank simultaneously, whereby teeth are formed simultaneously on both sides of the blank, the force tending to move the blank in one direction by one of said sets of die teeth being counterbalanced by the force tending to move the blank in the opposite direction by the other set of die teeth.

It is a further object of my invention, after having formed file teeth on the opposite sides of the blank in the manner above defined, to turn over the file blank so that the respective die teeth running in the same direction and angularly across the faces of the file blank will now extend in this manner across the file teeth already formed, and again simultaneously forming file teeth on both sides of the blank whereby two sets of teeth, each adapted to cut in both directions, are formed.

It is a further object of my invention to cause the blank to be moved relatively to the dies on opposite sides of the blank, as the same enter and are within the body of the dies, or what amounts to the same thing, to cause the two sets of dies to be moved relatively to each other while their teeth enter and are within the body of the blank, whereby the respective sets of teeth will be lifted and sharpened.

This application is a division of my application, Ser. No. 258,615, filed February 27, 1939.

The full objects and advantages of my invention will appear in connection with the detailed description thereof, and the novel features of the invention which secure the aforementioned advantageous and desirable objects and results are particularly set forth in the claims.

In the drawings presented for purposes of illustrating the steps by which the method of my invention is practiced:

Fig. 3 is a transverse sectional view taken on line 3—3 of Fig. 2.

Fig. 4 is a plan view of part of the apparatus employed in the practice of my invention viewed in the direction of the arrows along line 4—4 of Fig. 2.

Fig. 5 is a fragmentary sectional elevation view taken along line 5—5 of Fig. 4 and viewed in the direction of the arrows.

Fig. 6 is a perspective view of a gage member adapted to be adjustably secured to an end of the anvil die.

Fig. 7 is a fragmentary view taken in section through the sets of die teeth with a file blank between them, the teeth just contacting the surfaces of the blank, to show the relation of the opposite sloping faces of said teeth, all parts on an enlarged scale.

Fig. 8 is a fragmentary view similar to Fig. 7 showing the position of the parts after the die teeth have been caused to enter the file blank.

Fig. 9 is a fragmentary sectional view of a file blank with teeth formed therein, greatly enlarged for purposes of easy understanding.

Fig. 10 is a fragmentary sectional view similar to the view of Fig. 9 and on a similarly enlarged scale showing the teeth after dies have acted twice on each side of the die blank and showing how said teeth are adapted to cut in opposite directions.

Fig. 11 is a plan view of a portion of a file blank showing teeth cut therein running obliquely across the file blank in one direction.

Fig. 12 is a view similar to Fig. 11 with sets of the teeth running in opposite directions.

Figure 1:
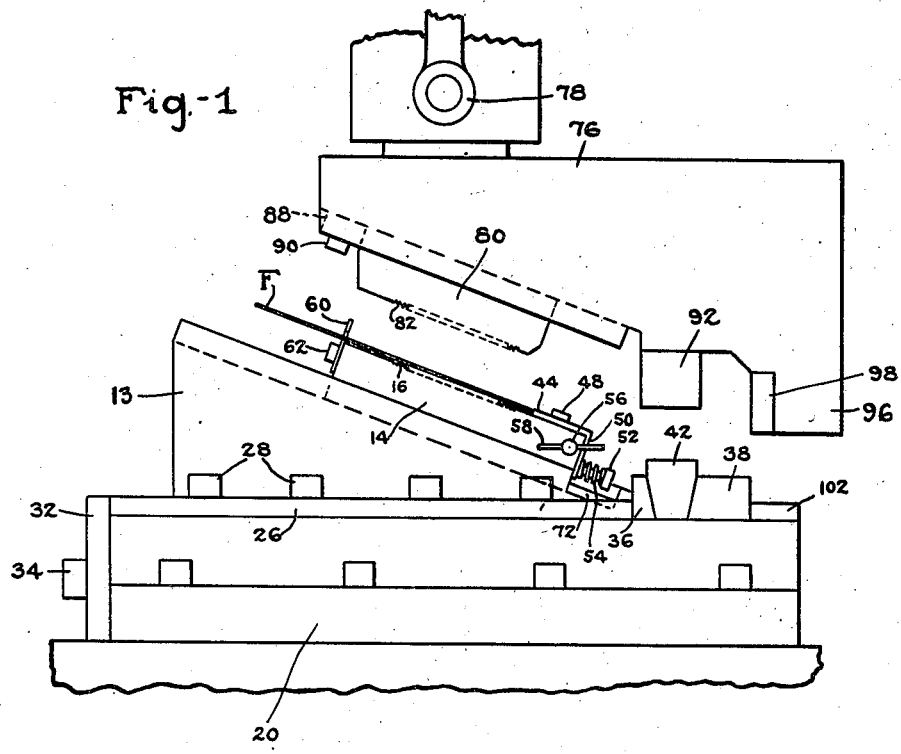
Fig. 1 is an elevation view of an apparatus for carrying out my process viewed from the side.

It will be understood that the particular mechanism illustrated by the drawings and which will now be described is used in carrying out the steps of my process, but that other instrumentalities and means may be employed for that purpose without departing from the invention as here claimed.

An anvil member 13 carries a die plate 14 which is provided with teeth 16 as shown in Figs. 7 and 8. A series of rollers 18 upon a frame bed 20 form a support for the anvil 13 and die member 14. Referring to Fig. 3, it will be noted that the bed 20 is provided with side ribs 22 between which the anvil member 13 rests. Plates 26 are secured to the members 22 by means of bolts 28, and plates 26 overlie shoulders 24 formed on the member 13, as clearly shown in Fig. 3.

Figure 2:
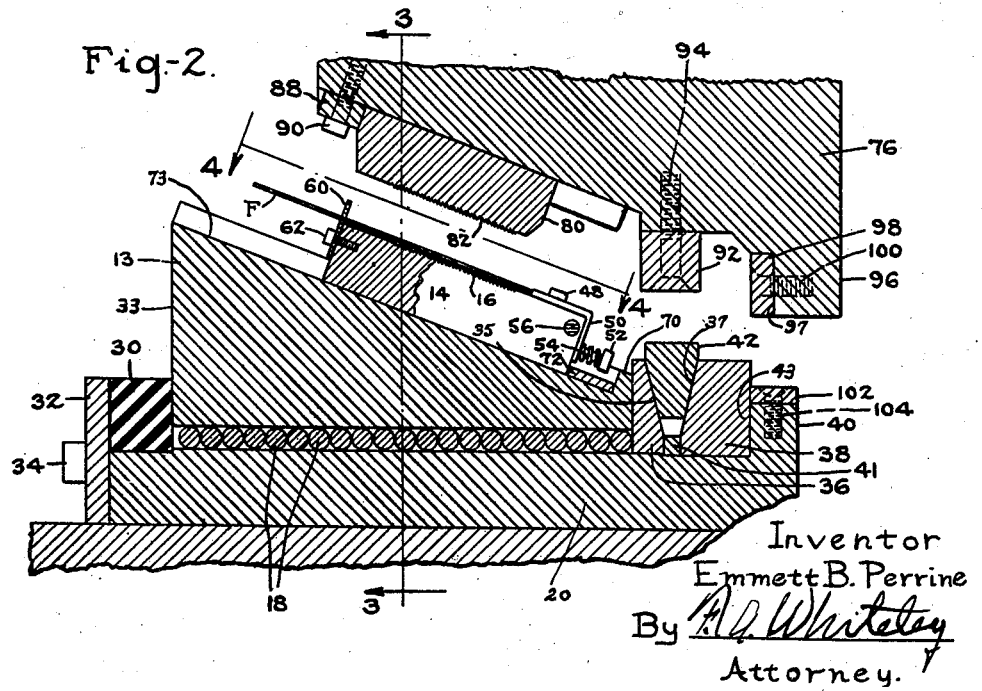
Fig. 2 is a side sectional view of the same apparatus shown in Fig. 1 with some parts shown not in section.

A plate 32 is secured to the back of bed 20 by means of bolts 30 and between plate 32 and the rear face 33 of anvil block 13 is positioned a yielding member 30 which may be of rubber or other desired yielding or resilient material. This resilient means, which might if desired be a strong compression spring, holds the member 13 against a block 36 slidable on the bed 20. A second block 38 engages a raised portion 40 of the bed 20 and extends between a strip 41 on bed plate 20 and the inner wall 43 of raised portion 40. It will be apparent from the above description that the sliding block 36 is normally held in contact with the strip 41 by means of the resilient member 30. The block 36 is formed with an inclined wall 35 and block 38 is formed with an inclined wall 37, Fig. 2. A wedge-shaped member 42 is provided with correspondingly inclined walls which rest upon and engage the walls 35 and 37 of sliding block 36 and fixed block 38. From the above it will be clear that when the wedge 42 is forced downwardly it exerts a powerful wedging action exerted against the sliding block 36 and the anvil block 13 and in turn against the resilient block 30, resulting in sliding the anvil block upon the roller bearings 18.

Mounted upon the upper surface of the die 14 and on the front thereof is a gage 44, which is provided with a recess 46 to receive one end of a file blank F. Adjustment of gage 44 on die 14 is effected by means of a screw 48 passing through a slot in the gage. Formed on the gage is a front wall 50 which contains a perforation through which a screw 52 is turned part way into the die 14. Between the head of screw 52 and wall 50 is a spring 54 which holds the gage wall 50 against the front wall of the die 14.

The die 14 has a recess in its front portion which receives a rod-like member 56. This member has a plurality of faces disposed at different distances from the axial line of the recess, Fig. 5. By means of a handle 58 secured to member 56 it may be rotated as desired. By these means the file blank F may be adjusted in longitudinal position as desired. A side gage 60 is fastened on the rear of the anvil die 14 by means of a screw 62 which passes through a slot 64 of the gage, thus enabling the gage to be adjusted to accommodate different widths of file blanks so that in all cases the center line of the blank will coincide with the center line of the die. Referring to Fig. 3 it will be noted that the anvil die 14 has a supporting portion with sloping side walls dovetailed into a receiving channel 63. A wedge 66 fits in this channel and by means of a screw 68 is caused to engage a side of the dovetailed support of anvil member 14, thus holding it firmly in position and at the same time enabling it readily to be removed for change of the die. The front wall of anvil member 13, Figs. 2 and 4, has an upward projection 70 back of which a strip 72 is held by screws 74. The die 14 has its front engaging the strip 72 to restrain it from moving forwardly, it being noted, Fig. 2, that the die 14 rests upon the sloping top wall 73 of anvil block 13.

A support 76 for a movable die is supported for movements vertically or in an analogous manner by means of a crank indicated as connected at 78, all operating in a well known manner. Supported in this manner is a die plate 80 provided with teeth 82, as shown in enlarged scale in Figs. 7 and 8. Referring to Fig. 3, die 80 has its upper portion dovetailed into a recess 81 of the reciprocating member 76 and is held firmly therein by means of a wedge 84 secured by a screw 86 which has sloping walls engaging respectively the member 76 and the dovetailed portion of the die.

Referring to Fig. 1, it will be seen that the lower wall of the die 80 is contacted by a block 88 secured by screws 90 so the die 80 is held from movements in a backward direction on the member 76. Upon the reciprocating member 76 is formed a member 92 which acts as a hammer to engage the wedge 42 when the member 76 is pressed down sufficiently to cause the teeth 16 and 82 to enter and be held within the body of the faces of the opposite sides of blank F. The hammer 92 is held in position by means of screws 94, as clearly indicated in Fig. 2. The forward portion of plunger 76 is formed with an extended part 96 having an inner vertical face 97. A plate 98 is secured to the face 97 by screws 100. The plate 98 is positioned relative to block 38 so that it engages the back of said block just before the teeth of the dies enter the file blank and thus resists the tendency of the reciprocating member to move forward as the teeth are being formed. The top of bed extension 40, Fig. 2, has secured thereto by screws 104, a plate 102 which acts as a stop to control the downward movement of the reciprocating member 76. This plate 102 is changeable with other plates so that varying degrees of movement of the die teeth into the die blank may be controlled.

The enlarged figures 7 and 8 show that each of the die teeth 16 is provided with a face 15 substantially normal or vertical to the file blank F, and a face 17 which has a marked slant, thus producing quite sharply pointed die teeth for the die 14. Similarly the upper die teeth 82 on the die 80 are all provided with faces 81 substantially vertical to the plane of the blank F with slanting faces 83. It will be noted that the slanting faces 17 and 83 slope in opposite directions from the vertical faces 81 and 15. Also that the lines of force or the lines of direction between the sloping faces 17 and 83 fall practically in common planes.

The respective die teeth 16 and 83 are thus relatively positioned, as shown in Fig. 7, so that when the blank F is in position resting on the die teeth 16, with their surfaces 15 in planes vertical to the surfaces of the blank F, at the moment the points of die teeth 82 engage the top surface of blank F, the oppositely sloping faces 17 and 83 of die teeth 16 and 82 respectively falling in substantially common planes, causes the component of the thrusts of the die teeth 16 and 82 into the blank F as it is moved by the anvil, to be in these planes, so that the force exerted upon the blank by the respective die teeth 16 and 82 is exerted in opposition and the tendency to move the blank in one direction by the die teeth 16 entering the underside of the blank F is exactly offset by the tendency to move the blank in the opposite direction by the die teeth 82 on the movable die. The die teeth 16 and 82 respectively are caused to cross the file blank at the same angle on both of its sides. The movement of the anvil holding the blank relative to the movement of the movable die is, therefore, in effect, a movement of the blank relative to the crossing die teeth whatever their angle. The complementary forces exerted by the gripping of the blank between the teeth of the anvil and of the movable die, taken with the movement of the two sets of die teeth relative to the faces of the blank, are what cause the metal of the blank to be literally pushed forward against the vertical faces 15 and 81 of the crossing die teeth to cause the resulting file teeth formed in the blank to be lifted in a sharp edge, as clearly shown in Fig. 9.

At the moment the die teeth enter the file blank and as the teeth reach their deepest penetration of the file blank, the anvil 13 and its die 14 are forced backwardly by reason of the fact that at that time wedge 42 is engaged by hammer member 92, while at the same time the movable die member 76 and its die 80 are prevented from lateral or backward movement. The front or vertical faces 81 of the die teeth 82 are turned to prevent the backward movement of the file blank, while the similar vertical faces 15 of the die teeth 16 are turned to cause backward movement of the file blank. The result is that simultaneously the teeth 16 and the teeth 82 are entering opposite faces of the file blank and pushing the penetrated metal against faces 15 and 81 with the result that the file blank itself moves only half as far as the anvil member 14 and there is relative movement between the file blank and each set of die teeth 16 and 82.

The bite of the die teeth respectively into the file blank is indicated in Fig. 7 by the dotted lines a and b respectively. The vertical faces 81 of the die teeth 82 will enter the file blank with a swaging action, while the sloping faces 83 of die teeth 82 will have a shearing action on the file blank. The anvil teeth 16 at the same time have the same effect, but in reverse direction, thus producing teeth such as indicated in Fig. 9 at c and d respectively.

The apparatus above described is well adapted to carry out my process. This requires two sets of die teeth extending in relative parallel alinement across the die blocks as held, together with means for holding a file blank in such position in relation to the die teeth that the die teeth will extend obliquely in parallel relation across both faces of the file blank. When the file blank is held in this manner in relation to the two sets of die teeth, and the die teeth are brought upon the file blank with suitable high pressure, such as thirty tons per square inch, a complete set of file teeth will be formed on each side of the file blank, these teeth extending across the blank obliquely in the same direction. If now the file blank is turned over, not end for end, but transversely, so as to reverse the faces thereof, while maintaining the longitudinal relation of said faces the same, the die teeth will be extended obliquely across the file blank and the teeth already formed thereon, on both sides, but in opposite directions so as to cross the teeth on the blank. When a second operation of forming teeth takes place, therefore, the second set of teeth formed will cross the first set of teeth on each side of the file blank, as shown in Fig. 12, and the appearance of the completed file teeth will be as shown in longitudinal section in Fig. 10.

The carrying out of the steps of my process by the above noted instrumentalities is along the following lines: the respective dies, two in number, will be held facing each other in spaced relation with die teeth running across the dies in the same direction but formed with faces sloping in opposite directions, so in effect the teeth themselves slope in opposite directions. The file blank F will be supported between the two sets of die teeth in such manner relatively thereto that both sets of die teeth extend across opposite faces of the file blank at an angle. This means of support may be directly upon the anvil die, as shown in the drawings, or obviously it may be entirely independent of the anvil die so long as it is between the two dies and the file blank is held longitudinally extended so the die teeth will extend at an angle across its face.

With the parts positioned as above outlined, the die members 14 and 80 are caused to approach each other and grip the file blank between them against the die teeth 16 and 82 with very great force. The opposite slopes of the die teeth prevent any tendency of the file blank to move one way or the other out of position. At the moment the die teeth reach and begin to enter the surfaces of the file blank, the two sets of die teeth are caused to move relatively to one another in a direction along the length of the file blank, with the result that, as the die teeth over the file blank are moving into it and are imbedded in opposite sides of the file blank, the two sets of die teeth are moved relatively in opposite directions, the forces of this movement being expended in directly opposed directions on opposite faces of the file blank. The particular means of effecting these two movements relatively of the die teeth, first toward each other to grip the file blank, and second relatively in opposite directions along the file blank, are effectively performed by the apparatus shown. Obviously the movements might be accomplished by other means than those shown, which are only to exemplify means for carrying out the steps of my process.

The advantages of my invention quite clearly appear from the foregoing description. One very great advantage resides in the making simultaneously of a complete set of file teeth on both surfaces of a file blank, this resulting in such savings in operation that in a given length of time at least ten times as many completed files can be made as with the employment of the former method of cutting files one tooth at a time. Further, the file teeth made by my method are actually drawn sharper and have a better cutting operation than those made by former processes; and finally, by cutting teeth according to this process on reverse faces of the file blank, I am able to obtain file teeth on both sides of the file blank which cut with a high degree of efficiency in both directions. Further, the method universally used of making files by cutting the teeth on one side of the file blank only, one at a time, and then reversing the file blank and cutting the teeth on the opposite side of the file blank, necessarily requires that during the second cutting operation the first set of file teeth will have to engage a metal supporting surface, and the cutting of the second set of file teeth on the opposite face necessarily results in deformation and dulling of the first set of file teeth previously cut.

This method is particularly adaptable for the making of very fine-toothed files, specifically for what is known as fingernail files. Since these files cut in both directions, in use it will be found most rapidly effective to merely slide the file back and forth along the nails, which thereby will be reduced to the degree and shape desired.

I claim:

1. A method of making files having a multiplicity of cutting teeth on opposite sides of the file adapted respectively to cut in opposite directions, which consists in providing a pair of dies each having a multiplicity of teeth for forming the file teeth on opposite sides of the file simultaneously, said die teeth having substantially vertical faces and other faces sloping in opposite directions on the respective dies, holding said dies spaced and with the sets of teeth of the respective dies having their outer edges in parallel planes, holding a file blank between said sets of die teeth edges, moving the respective sets of die teeth relatively so their sets of edges are parallel at the faces of the file blank and thereafter said respective sets of edges are caused to move simultaneously into opposite sides of the file blank, and moving the two sets of die teeth relatively along the planes of their edges in opposite directions as the die teeth enter and move into the body of the file blank at opposite sides thereof to cause the vertical faces of the die teeth to engage and lift the teeth being formed on opposite sides of the file blank.

2. A method of making files having a multiplicity of cutting teeth on opposite sides of the file which teeth are adapted respectively to cut in opposite directions on both sides of the file, which consists in providing a pair of dies each having a multiplicity of teeth for forming the file teeth on opposite sides of the file simultaneously and each having cutting edges extending longitudinally in the same direction in parallel planes, positioning a file blank between said die teeth so that the sets of teeth edges cross the file blank obliquely, moving the respective sets of die teeth relatively so their sets of edges are caused to move simultaneously into opposite sides of the file blank, moving the two sets of die teeth relatively along the planes of their edges in opposite directions as the die teeth enter and move into the body of the file blank at opposite sides thereof to cause the vertical faces of the die teeth to engage and lift the teeth on opposite sides of the file blank, thereafter turning the file blank over transversely and positioning it between the dies so that the sets of die teeth on opposite sides thereof will extend in parallel relation at angles across the teeth already cut on opposite sides of the file blank, and repeating the same operations to form teeth simultaneously on the turned opposite sides of the file blank extending across the first set of teeth formed thereon.

EMMETT B. PERRINE.